United States Patent [19]

Baur et al.

[11] Patent Number: 4,705,834

[45] Date of Patent: Nov. 10, 1987

[54] CROSSLINKED OXYALKYLATED POLYALKYLENEPOLYAMINES

[75] Inventors: Richard Baur, Dannstadt-Schauernheim; Knut Oppenlaender, Ludwigshafen; Klaus Barthold, Mannheim, all of Fed. Rep. of Germany

[73] Assignee: BASF Aktiengesellschaft, Fed. Rep. of Germany

[21] Appl. No.: 685,256

[22] Filed: Dec. 24, 1984

[30] Foreign Application Priority Data

Dec. 28, 1983 [DE] Fed. Rep. of Germany ....... 3347257

[51] Int. Cl.$^4$ ............................................ C08F 283/00
[52] U.S. Cl. .................................... 525/540; 525/523; 528/44; 528/66; 528/73; 528/76; 528/332; 528/341; 528/405; 564/505; 564/504
[58] Field of Search ................ 564/505, 504; 525/540, 525/523; 528/44, 66, 73, 76, 332, 341, 405

[56] References Cited

U.S. PATENT DOCUMENTS

| | | | |
|---|---|---|---|
| 3,654,370 | 4/1972 | Yeakey | 564/505 |
| 3,684,735 | 8/1972 | Oppenlaender et al. | 252/342 |
| 3,907,701 | 9/1975 | Liebold et al. | 252/344 |
| 4,436,891 | 3/1984 | Umeda et al. | 564/505 |

FOREIGN PATENT DOCUMENTS

| | | | |
|---|---|---|---|
| 1545250 | 12/1969 | Fed. Rep. of Germany | 10/8 |
| 2013820 | 10/1971 | Fed. Rep. of Germany | 33/4 |
| 2227546 | 1/1974 | Fed. Rep. of Germany | 7/4 |
| 2435713 | 2/1976 | Fed. Rep. of Germany | 33/4 |
| 2719978 | 11/1978 | Fed. Rep. of Germany | 33/4 |

Primary Examiner—John Kight
Assistant Examiner—M. L. Moore
Attorney, Agent, or Firm—Keil & Weinkauf

[57] ABSTRACT

Crosslinked oxyalkylated polyalkylenepolyamines which can be obtained by reacting polyalkylenepolyamines, which are completely oxyalkylated at the nitrogen atoms, in each case by from 10 to 300 groups, and possess from 50 to 2,000 repeating alkyleneimine units in the molecule, with from 0.5 to 10% by weight, based on the oxyalkylated polyalkylenepolyamines, of a crosslinking compound which possesses two or more functional groups which are capable of reacting with the terminal alcohol groups of the oxyalkylated polyalkylenepolyamines, and a process for breaking water-in-oil emulsions.

4 Claims, No Drawings

CROSSLINKED OXYALKYLATED POLYALKYLENEPOLYAMINES

The present invention relates to novel crosslinked oxyalkylated polyalkylenepolyamines and a process for breaking water-in-oil emulsions which occur in oil production.

In general, depending on their viscosity, water-in-oil emulsions are frequently heated at 40° C. or above, with high energy consumption, so that an (electro)chemical method can then be used to bring their content of water, salt and any residual emulsion to the desired low value.

Thus, it has been disclosed that block polymers of ethylene oxide and/or propylene oxide can be used as demulsifying agents for water-in-oil emulsions. For example, No. DE-A-1 545 250 describes a dewatering process in which various alkylene oxide polymers and compounds derived from these and containing hydrophilic terminal groups are added to the water-in-oil emulsions. These substances reach their full efficiency too slowly, and frequently only at elevated temperatures. Moreover, the content of residual water, residual salt or residual emulsion left behind after they have been used is still too high, and in particular they are sufficiently effective only for a few types of oil.

However, it is desirable to break water-in-oil emulsions without further heating, at as low as the production temperature, ie. usually from 10° to 40° C., by adding suitable products.

Because of the differing composition of crude oils, it is not possible to find a single demulsifying agent for oil emulsions which is effective for crude oils from any source; hence, there is also considerable interest in products which can be employed as demulsifying agents at least for a fairly large number of related types of oil.

No. DE-C-2 227 546 proposes using for this purpose polyalkylenepolyamines which are completely oxyalkylated at the nitrogen atoms, in each case by from 10 to 300 groups, and possess from 50 to 2,000 repeating alkyleneimine units in the molecule.

According to No. DE-B 2 435 713, quaternized polyalkylenepolyamine derivatives of this type are also very effective.

No. DE-C-2 013 820 describes the use of oxyalkylated isoalkylphenol-formaldehyde resins mixed with various esterification products for the stated purpose.

Finally, according to No. DE-C-2 719 978, the above object is achieved using mixtures of the stated polyalkylenepolyamine derivatives or their quaternized products with oxyalkylated isoalkylphenol-formaldehyde resins.

We have found novel crosslinked oxyalkylated polyalkylenepolyamines which can be obtained by reacting polyalkylenepolyamines which are completely oxyalkylated at the nitrogen atoms, in each case by from 10 to 300 groups, and possess from 50 to 2,000 repeating alkyleneimine units in the molecule, with from 0.05 to 10% by weight, based on the oxyalkylated polyalkylenepolyamines, of a crosslinking compound which possesses two or more functional groups which are capable of reacting with the terminal alcohol groups of the oxyalkylated polyalkylenepolyamines.

We have furthermore found that water-in-oil emulsions which occur during oil production and have a salt water content of from 0.1 to 99% by weight can advantageously be broken if this procedure is carried out by adding to the emulsion from 1 to 1,000 ppm, based on the weight of the emulsion, of the novel crosslinked oxyalkylated polyalkylenepolyamines.

The polyalkylenepolyamines which possess from 50 to 2,000 repeating alkyleneimine units in the molecule, and on which the uncrosslinked oxyalkylated polyalkylenepolyamines are based, are obtainable from ethyleneimine and/or 1,2-propyleneimine in a conventional manner. Ethyleneimine is the preferred starting material.

All conventional alkylene oxides such as ethylene oxide, 1,2-propylene oxide, 1,2- and 2,3-butylene oxide, styrene oxide or cyclohexene oxide, are suitable for the oxyalkylation of the polyalkylenepolyamines, 1,2-propylene oxide and ethylene oxide being preferred. In particular, 1,2-propylene oxide is used, either alone or as a mixture with ethylene oxide.

For the reaction with the polyalkylenepolyamines, the various alkylene oxides can be used individually or together with one another, ie. in accordance with a block copolymerization or copolymerization scheme.

The preparation of these oxyalkylated polyalkylenepolyamines is described in detail in No. DE-C-2 227 546.

The crosslinking compounds should possess two or more functional groups which are capable of reacting with the terminal alcohol groups of the oxyalkylated polyalkylenepolyamines.

Examples of such functional groups are the isocyanato group, the carboxyl group, alkoxycarbonyl groups containing a lower alkyl radical, and the glycidyl ether group.

Examples of crosslinking compounds are aliphatic and aromatic diisocyanates, dicarboxylic acids, diesters of dicarboxylic acids with lower alcohols, and bisglycidyl ethers of aliphatic and aromatic polyhydroxy compounds.

Noteworthy individual compounds are hexamethylene diisocyanate, toluylene diisocyanate, diphenylmethane diisocyanate, adipic acid, glutaric acid, succinic acid or mixtures of these carboxylic acids, the methyl and ethyl esters of these carboxylic acids or mixtures of these esters, and the bisglycidyl ethers of the hydroxy compounds bisphenol A, diphenylolmethane, pentaerythritol, trimethylolpropane, ethane-1,2-diol, propane-1,2-diol, butane-1,2-diol, butane-2,3-diol and glycerol.

Hexamethylene diisocyanate and the bisglycidyl ether of bisphenol A are particularly preferably used as crosslinking compounds.

Crosslinking of the oxyalkylated polyalkylenepolyamines is usually carried out in the presence of a solvent. However, when the bisglycidyl ethers are used as the crosslinking compounds, it is also possible to dispense with a solvent.

Suitable solvents are those which are inert under the reaction conditions, eg. toluene, xylene, chlorobenzene, N,N-dimethylformamide and N-methylpyrrolidone.

To carry out the crosslinking procedure, a solution of the oxyalkylated polyalkylenepolyamines in an inert solvent is initially taken and heated to 30°–160° C., preferably 40°–110° C., after which a solution containing from 0.5 to 10, preferably from 1 to 6, % by weight, based on the amount of the oxyalkylated polyalkylenepolyamine, of the crosslinking compound used is added slowly.

Stirring is then continued at the stated temperature range until the reaction is complete, which is generally the case after from 2 to 8 hours.

In the case of reactions in which water is formed as a reaction product, it is advantageous to remove this water of reaction together with the particular solvent by azeotropic distillation.

The crosslinked products are preferably employed in solution in the novel process because they are easier to meter, and the resulting reaction solutions can therefore be used directly.

If the procedure is carried out in the absence of solvents, as is possible in the case of the bisglycidyl ethers, or the solvent used has initially been removed after cross-linking has been carried out, these solvent-free products are preferably also brought into solution. Mixtures of organic solvents (eg. methanol) with water, or organic solvents alone, which boil at from 50° to 200° C., eg. toluene, xylenes, tetrahydrofuran, dioxane, lower alcohols or light gasoline fractions boiling within the stated range, can be used as the solvent.

The products according to the invention can be employed as demulsifying agents for oil emulsions either alone or as a mixture with other conventional substances.

A preferred mixture which, in the novel process, advantageously breaks the water-in-oil emulsions consists of from 25 to 75, preferably from 40 to 60, % by weight of the oxyalkylated polyalkylenepolyamines crosslinked according to the invention and from 75 to 25, preferably from 60 to 40, % by weight of an oxyethylation and/or oxypropylation product of an isoalkylphenol-formaldehyde resin which contains from 3 to 30 benzene nuclei, each of which carries an oxyalkylate group of from 4 to 50 alkylene oxide units and an isoalkyl radical of 8 to 12 carbon atoms which is bonded in the p-position with respect to the oxyalkylene group, the percentages in each case being based on the mixture.

The oxyalkylated alkylphenol-formaldehyde resins are of the formula II

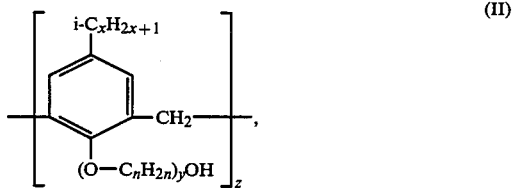

where x is an integer from 8 to 12, n is 2 or 3, y is an integer from 4 to 50 and z is an integer from 3 to 30.

The preparation of these compounds is disclosed in No. DE-C-2 013 820.

Another preferred mixture consists of from 25 to 75, preferably from 40 to 60, % by weight of the oxyalkylated polyalkylenepolyamines crosslinked according to the invention and from 75 to 25, preferably from 60 to 40, % by weigh of a block copolymer of the general formula I

where A is a poly-1,2-propylene oxide block having a molecular weight of from 600 to 3,000, B is a polyethylene oxide block having a molecular weight of from 600 to 3,500, and R is chlorine, alkoxyethoxy or acyloxy, the radicals R replacing the terminal hydroxyl groups of the block copolymer B—A—B; the percentages in each case are based on the mixture.

Such block copolymers form the subject of No. DE-A-1 545 250.

The novel crosslinked oxyalkylated polyalkylenepolyamines or their mixtures with oxyalkylated isoalkylphenolformaldehyde resins or with the stated block copolymers are, as mentioned above, preferably employed in solution, in the process according to the invention. In these solutions, the content of active ingredient, ie. of the demulsifying agent is advantageously brought to from 0.5 to 50% by weight. During the demulsification process, the solutions are added to the crude oils preferably at the wells (in the field). Demulsification then takes place at a temperature as low as that of the freshly produced water-in-oil emulsion, at a rate such that the emulsion can already be broken on the way to the preparation plant, where it is separated without difficulties, in a heated or unheated separator and possibly with the aid of an electric field, into pure oil and salt water.

The demulsifying agents are advantageously added to the crude oil emulsions in amounts of from 1 to 1,000, preferably from 10 to 100, ppm, based on the weight of the emulsion to be broken, at from 10° to 80° C.

Using the novel process, water-in-oil emulsions having a salt water content of about 0.1–99% by weight can be broken. Oils which can be rapidly dewatered in this manner are crude oil emulsions from a very wide variety of sources.

Separation of the water-in-oil emulsions takes place extremely rapidly and virtually quantitatively within the stated temperature limits, without additional heat being supplied.

The novel demulsifying agents are particularly useful for breaking difficult emulsions, particularly clean waste waters being obtained. Because they are consumed in extremely small amounts, they are very economical to use. Furthermore, they separate the emulsions very rapidly, effect complete demulsification and function even at temperatures which are only slightly above the pour point of the crude oil.

Surprisingly, the results obtained using the novel crosslinked oxyalkylated polyalkylenepolyamines, even as a mixture with conventional demulsifying agents, are substantially better than those obtained when the latter are used alone.

The Examples which follow illustrate the invention.

I.

PREPARATION OF THE STARTING MATERIALS OXYALKYLATED POLYETHYLENEPOLYAMINE A1

(Two-stage process)

1st stage (thermal)

172 g (2 moles) of polyethylenepolyamine possessing about 100 repeating ethyleneimine units, in the form of a 50% strength by weight aqueous solution, were initially taken in a V$_2$A stainless steel stirred autoclave, and 116 g (2 moles) of 1,2-propylene oxide were forced in, a little at a time, at from 90° to 100° C.

Time: 2 hours
Superatmospheric pressure: 6 bar
Temperature: 90°–100° C.

The water was then removed by distillation at 100° C./19.7–26.3 mbar.

2nd stage (catalytic)

15.6 g (0.15 mole) of the product from the first stage and 0.624 g (4% by weight, based on the product from the first stage) of KOH powder were initially taken together in a V₂A stainless steel stirred autoclave, and 687 g (11.85 moles) of 1,2-propylene oxide (PrO) were forced in a little at a time at 135° C., and 132 g (3 moles) of ethylene oxide (EO) were forced in a little at a time at 125° C.
Time: 6 hours
Superatmospheric pressure: 6-8 bar
Temperature: 135° C. (PrO).
Time: 2 hours (EO)
Temperature: 125° C. (EO).

Stirring was continued until the pressure remained constant, which took 4 hours. The product obtained could be used directly. It consisted of an adduct of the polyethylenepolyamine with about 80 moles of 1,2-propylene oxide and 20 moles of ethylene oxide.

Oxyalkylated polyethylenepolyamine A2

(two-stage process)

1st stage (thermal)

172 g (2 moles) of polyethylenepolyamine possessing about 1,000 repeating ethyleneimine units, in the form of a 50% strength by weight aqueous solution, were initially taken in a V₂A stainless steel stirred autoclave, and 116 g (2 moles) of 1,2-propylene oxide were forced in, a little at a time, at from 90° to 100° C.
Time: 3 hours
Superatmospheric pressure: 6 bar
Temperature: 90°-100° C.

The water was then removed by distillation at 100° C./19.7-26.3 mbar.

2nd stage (catalytic)

15.2 g (0.15 mole) of the product from the first stage and 0.624 g (4% by weight, based on the product from the first stage) of KOH powder were initially taken together in a V₂A stainless steel stirred autoclave, and 738 g (13.5 moles) of 1,2-propylene oxide were then forced in, a little at a time, at 135° C.
Time: 6-8 hours
Superatmospheric pressure: not more than 10 bar
Temperature: 135° C.

Stirring was continued until the pressure remained constant, which took 4 hours. The product obtained could be used directly. It consisted of an adduct of the polyethylenepolyamine with about 90 moles of 1,2-propylene oxide.

Oxyalkylated polyethylenepolyamine A3

(two-stage process)

1st stage (thermal)

172 g (2 moles) of polyethylenepolyamine possessing about 50 repeating ethyleneimine units, in the form of a 50% strength by weight aqueous solution, were initially taken in a V₂A stainless steel stirred autoclave, and 116 g (2 moles) of 1,2-propylene oxide were forced in, a little at a time, at from 90° to 100° C.
Time: 3 hours
Superatmospheric pressure: 6 bar
Temperature: 90°-100° C.

The water was then removed by distillation at 100° C./19.7-26.3 mbar.

2nd stage (catalytic)

15.6 g (0.15 mole) of the product from the first stage and 0.624 g (4% by weight, based on the product from the first stage) of KOH powder were initially taken together in a V₂A stainless steel stirred autoclave, and 565 g (9.75 moles) of 1,2-propylene oxide were then forced in, a little at a time, at 135° C.
Time: 6 hours
Superatmospheric pressure: not more than 10 bar
Temperature: 135° C.

Stirring was continued until the pressure remained constant, which took 4 hours. The product obtained could be used directly. It consisted of an adduct of the polyethylenepolyamine with about 65 moles of 1,2-propylene oxide.

II.

PREPARATION OF THE CROSSLINKED PRODUCTS DEMULSIFYING AGENT (E1) FOR OIL EMULSIONS 75 g of A1 were dissolved in 280 g of xylene, and a solution of 1.5 g of hexamethylene diisocyanate in 26 g of xylene was slowly added dropwise at 40° C. Stirring was continued at 60° C. until the isocyanate was completely converted; this took 4 hours.

A 20% strength by weight solution of E1 in xylene was obtained.

DEMULSIFYING AGENT (E2) FOR OIL EMULSIONS 75 g of A3 were dissolved in 280 g of xylene, and a solution of 1.5 g of hexamethylene diisocyanate in 10 g of xylene was slowly added dropwise at 50° C. Stirring was continued for 4 hours at 80° C., after which the solvent was removed under reduced pressure from a water pump, at about 80° C.

Demulsifying agent (E3) for oil emulsions 75 g of A2 were dissolved in 290 g of xylene, and a solution of 0.75 g of hexamethylene diisocyanate in 13 g of xylene was slowly added dropwise at 40° C. Stirring was continued for 4 hours at 80° C.

A 20% by weight solution of E3 in xylene was obtained.

Demulsifying agent (E4) for oil emulsions 75 g of A3 in 67 g of xylene were initially taken, and 0.15 g of KOH powder was added. A solution of 2.25 g of the bisglycidyl ether of bisphenol A in 10 g of xylene was slowly added dropwise at 130° C., and the mixture was refluxed for 2 hours and neutralized with 0.95 g of dodecylbenzenesulfonic acid. The solvent was then removed under reduced pressure from a water pump.

Demulsifying agent (E5) for oil emulsions 75 g of A2 were dissolved in 76.5 g of toluene, and 1.5 g of a mixture of 30% by weight of succinic acid, 45% by weight of glutaric acid and 25% by weight of adipic acid were added. The mixture was heated at the boil until the calculated amount of water (0.4 g) had separated off.

A 50% strength by weight solution of E5 in toluene was obtained.

Demulsifying agent (E6) for oil emulsions 75 g of A3 were dissolved in 60 g of xylene, 1.5 g of toluylene diisocyanate in 16.5 g of xylene were added dropwise at 50° C., and stirring was continued for 4 hours at a temperature of 120° C.

A 50% strength by weight solution of E6 in xylene was obtained.

III.
APPLICATION EXPERIMENTS

| Demulsifying agent | Amount (ppm) | Amount of water separated off in ml. after | | | | | | | | |
|---|---|---|---|---|---|---|---|---|---|---|
| | | 10 min | 20 min | 30 min | 45 min | 1 h | 2 h | 3 h | 4 h | 16 h |
| North German Crude Oil 1, Water content 40% by weight, demulsification temperature 60° C. | | | | | | | | | | |
| E1 | 35 | 1 | 7 | 15 | 30 | 31 | 33 | 36 | | 39 |
| Comparative experiment: A1 | 35 | 2 | 5 | 12 | 23 | 27 | 19 | 30 | | 31 |
| E2 | 35 | 7 | 20 | 36 | 38 | 38 | 38 | 38 | | 39 |
| Comparative experiment: A3 | 35 | 0 | 2 | 3 | 6 | 15 | 21 | 25 | | 29 |
| E3 | 35 | 0 | 2 | 3 | 5 | 8 | 22 | 32 | | 37 |
| E5 | 35 | 0 | 1 | 2 | 4 | 7 | 18 | 25 | | 35 |
| Comparative experiment: A2 | 35 | 0 | 1 | 2 | 3 | 5 | 14 | 21 | | 29 |
| E4 | 35 | 0 | 3 | 8 | 20 | 33 | 34 | 34 | | 36 |
| E6 | 35 | 1 | 7 | 15 | 30 | 31 | 33 | 34 | | 35 |
| Comparative experiment: A3 | 35 | 0 | 2 | 3 | 6 | 15 | 21 | 25 | | 29 |
| North German Crude Oil 2, Water content approx. 50% by weight, demulsification temperature 27° C. | | | | | | | | | | |
| 1:1 Mixture of E2 and resin demulsifying agent according to DE-C-2 013 820 (Component A) | 50 | 10 | 36 | 43 | 50 | 52 | 52 | | 52 | 52 |
| Comparative experiment: 1:1 Mixture of Components A and B according to DE-C-2 719 978 | 50 | 4 | 23 | 28 | 46 | 48 | 50 | | 50 | 50 |
| North German Crude Oil 3, Water content 45% by weight, demulsification temperature 60° C. | | | | | | | | | | |
| 1:1 Mixture of E2 and resin demulsifying agent according to DE-C-2 013 820 (Component A) | 50 | 24 | 37 | 44 | 44 | 44 | 44 | | 45 | 45 |
| Comparative experiment: 1:1 Mixture of Components A and B according to DE-C-2 719 978 | 50 | 5 | 14 | 16 | 17 | 18 | 19 | | 23 | 29 |

We claim:
1. A crosslinked oxyalkylated polyalkylenpolyamine which is obtained by reacting a polyalkylenepolyamine, which is completely oxyalkylated at the nitrogen atoms, in each case by from 10 to 300 groups, and possesses from 50 to 2,000 repeating alkyleneimine units in the molecule, with from 0.5 to 10% by weight, based on the oxyalkylated polyalkylenepolyamine, of a crosslinking compound which possesses two or more functional groups which are capable of reacting with the terminal alcohol groups of the oxyalkylated polyalkylenepolyamine.

2. A crosslinked oxyalkylated polyalkylenepolyamine as defined in claim 1, which is obtained by reacting a polyethylenepolyamine which is completely oxyethylated and/or oxypropylated at the nitrogen atoms, in each case by from 10 to 300 groups, and possesses from 50 to 2,000 repeating ethyleneimine units in the molecule, with from 0.5 to 10% by weight, based on the oxyethylated and/or oxypropylated polyethylenepolyamine, of a crosslinking compound which possesses two or more functional groups selected from the group consisting of isocyanato group, carboxyl group, alkoxycarbonyl groups containing a lower alkyl radical and the glycidyl ether group.

3. A crosslinked oxyalkylated polyalkylenepolyamine as in claim 1, which is obtained by reacting an oxyalkylated polyalkylenepolyamine with from 1 to 6% by weight, based on the oxyalkylated polyalkylenepolyamine, of a compound which crosslinks with the terminal alcohol groups of the oxyalkylated polyalkylenepolyamine.

4. A crosslinked oxyalkylated polyalkylenepolyamine as in claim 1, which is obtained by reacting an oxyalkylated polyalkylenepolyamine with a crosslinking compound selected from the group consisting of hexamethylene diisocyanate, toluylene diisocyanate, diphenylmethane diisocyanate, adipic acid, glutaric acid, succinic acid or mixtures of these carboxylic acids, the methyl and ethyl esters of these carboxylic acids or mixtures of these, and the bisglycidyl ethers of the hydroxy compounds bisphenol A, diphenylolmethane, pentaerythritol, trimethylolpropane, ethane-1,2-diol, propane-1,2-diol, butane-1,2-diol, butane-2,3-diol ad glycerol.

* * * * *